US008898750B2

(12) United States Patent
Dattagupta et al.

(10) Patent No.: US 8,898,750 B2
(45) Date of Patent: Nov. 25, 2014

(54) CONNECTING REMOTE AND LOCAL NETWORKS USING AN IDENTIFICATION DEVICE ASSOCIATED WITH THE REMOTE NETWORK

(75) Inventors: Siddhartha Dattagupta, Irvine, CA (US); James J. Simon, San Marcos, CA (US)

(73) Assignee: Cisco Technology, Inc., San Jose, CA (US)

(*) Notice: Subject to any disclaimer, the term of this patent is extended or adjusted under 35 U.S.C. 154(b) by 220 days.

(21) Appl. No.: 13/216,015

(22) Filed: Aug. 23, 2011

(65) Prior Publication Data
US 2013/0055363 A1   Feb. 28, 2013

(51) Int. Cl.
*G06F 7/04* (2006.01)
*H04L 29/06* (2006.01)
*H04L 12/28* (2006.01)

(52) U.S. Cl.
CPC ........ *H04L 12/2818* (2013.01); *H04L 63/0853* (2013.01); *H04L 63/0492* (2013.01); *H04L 63/062* (2013.01); *H04L 63/105* (2013.01)
USPC .......................................................... 726/5

(58) Field of Classification Search
None
See application file for complete search history.

(56) References Cited

U.S. PATENT DOCUMENTS

| | | | | |
|---|---|---|---|---|
| 6,822,971 | B1 * | 11/2004 | Mikkonen | 370/475 |
| 6,839,553 | B2 * | 1/2005 | Park | 455/411 |
| 7,171,198 | B2 * | 1/2007 | Paila et al. | 455/432.1 |
| 8,359,643 | B2 * | 1/2013 | Low et al. | 455/410 |
| 2003/0191802 | A1 * | 10/2003 | Zhao et al. | 709/203 |
| 2004/0143628 | A1 * | 7/2004 | Bradford et al. | 709/203 |
| 2005/0216344 | A1 * | 9/2005 | Collet et al. | 705/14 |
| 2005/0235103 | A1 * | 10/2005 | Saliba et al. | 711/111 |
| 2006/0089121 | A1 * | 4/2006 | Elgebaly et al. | 455/410 |
| 2009/0124284 | A1 * | 5/2009 | Scherzer et al. | 455/552.1 |

\* cited by examiner

*Primary Examiner* — Peter Poltorak
(74) *Attorney, Agent, or Firm* — Patterson + Sheridan, LLP

(57) ABSTRACT

One or more portable identification devices associated with a first smart network can be carried with a user of the first smart network to a second smart network and used to automatically identify the first smart network and allow authorized access to the smart network via the second smart network. The one or more portable identification devices are configured to automatically provision the second smart network with the information necessary for the second smart network to identify the first smart network and the authorization credentials to connect to the first smart network. In some example embodiments, the portable identification devices may be RFID tags.

14 Claims, 9 Drawing Sheets

CONNECTING REMOTE AND LOCAL NETWORKS USING AN IDENTIFICATION DEVICE ASSOCIATED WITH THE REMOTE NETWORK

BACKGROUND

1. Technical Field

Embodiments of the present invention relate generally to wireless networks and, more specifically, to connecting remote and local networks using an identification device associated with the remote network.

2. Description of the Related Art

Home networks, in which multiple computing and/or peripheral devices are communicatively linked together in a consumer's home, are becoming increasingly ubiquitous. Because such networks are typically linked to the Internet, a user of a home network can, in theory, access his or her home network and any devices thereon remotely, i.e., from another home network. In practice, however, procedures for establishing remote access to a home network are typically too involved for the majority of home network users to implement reliably. For example, a network user may need to manually reconfigure the home network router, determine the network IP address and/or hostname, establish network credentials, etc., all prior to leaving the home network. Given the added complication that the network user must locate the home network and login remotely while navigating the operating system and networking software of an unfamiliar network further reduces the chances of such remote access being established successfully. Furthermore, establishing a network level authentication and identification between a home and a visiting network with minimum user intervention has always been a challenge.

Accordingly, there is a need in the art for systems and methods that reliably and conveniently enable the user of a home network to remotely access one or more devices or services associated with the home network.

BRIEF DESCRIPTION OF THE DRAWINGS

So that the manner in which the above recited features of the present invention can be understood in detail, a more particular description of the invention may be had by reference to example embodiments, some of which are illustrated in the appended drawings. It is to be noted, however, that the appended drawings illustrate only example embodiments of this invention and are therefore not to be considered limiting of its scope, for the invention may admit to other equally effective embodiments.

For clarity, identical reference numbers have been used, where applicable, to designate identical elements that are common between figures. It is contemplated that features of one example embodiment may be incorporated in other example embodiments without further recitation.

DESCRIPTION OF EXAMPLE EMBODIMENTS

In the following description, numerous specific details are set forth to provide a more thorough understanding of various example embodiments of the invention. However, it will be apparent to one of skill in the art that certain embodiments of the invention may be practiced without one or more of these specific details. In other instances, well-known features have not been described in order to avoid obscuring the invention.

Overview

One example embodiment of the present invention sets forth a method comprising detecting the presence of a portable device associated with a remote network, obtaining information from the portable device that identifies the remote network and allows authorized access to the remote network, based on the obtained information, establishing a network connection with a smart network host device located within the remote network, and enabling a user to access from a local network at least one or more devices or one or more services associated with the remote network via the established connection.

Another example embodiment of the present invention sets forth a computer-readable medium including instructions that, when executed by a processing unit, cause the processing unit to perform the steps of detecting the presence of a portable device associated with a remote network, obtaining information from the portable device that identifies the remote network and allows authorized access to the remote network, based on the obtained information, establishing a network connection with a smart network host device located within the remote network, and enabling a user to access from a local network at least one or more devices or one or more services associated with the remote network via the established connection.

Yet another example embodiment of the present invention sets forth a system comprising a smart network host device located within a local network that is configured to detect the presence of a portable device associated with a remote network, obtain information from the portable device that identifies the remote network and allows authorized access to the remote network, based on the obtained information, establish a network connection with a smart network host device located within the remote network, and enables a user to access from a local network at least one or more devices or one or more services associated with the remote network via the established connection.

DETAILED DESCRIPTION OF THE FIGURES

Figure 1A:
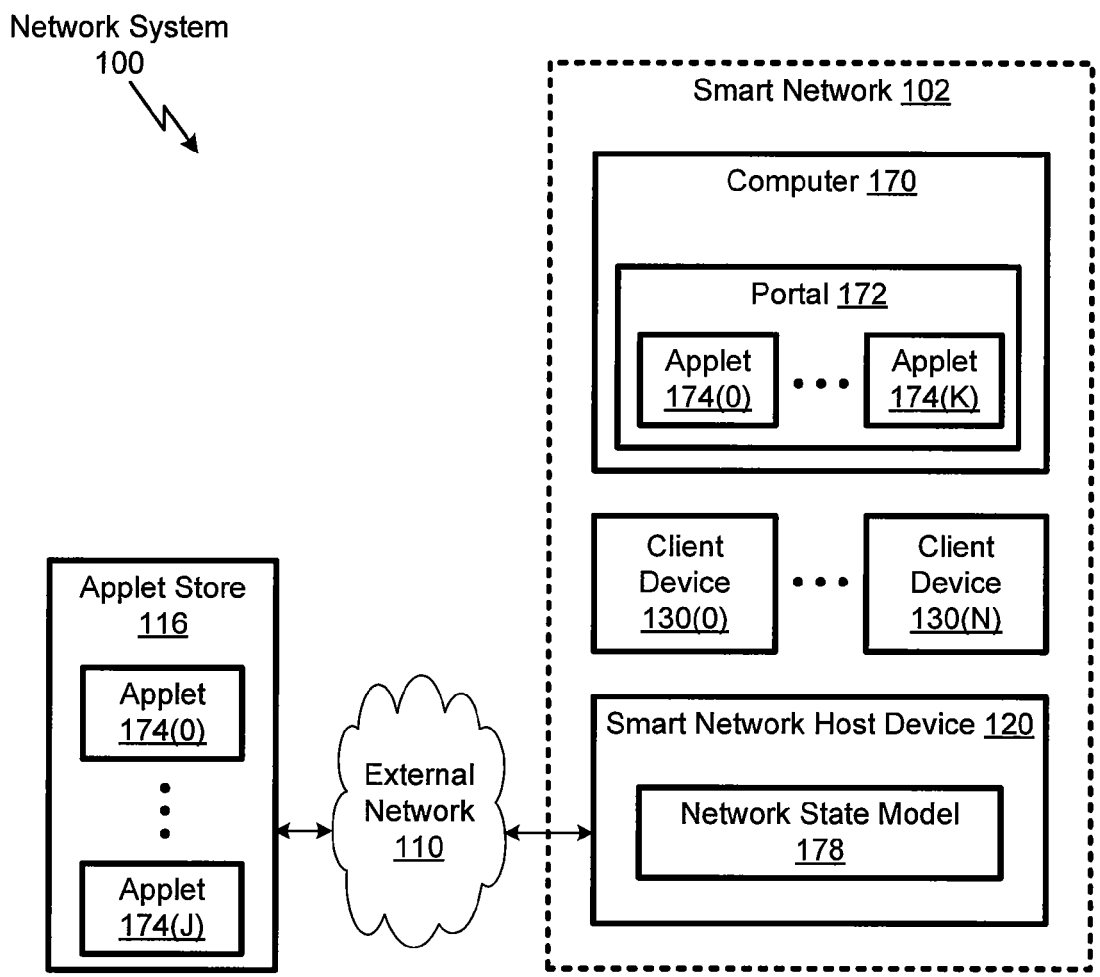
FIG. 1A is an exemplary illustration of an overarching network system configured to implement one or more aspects of the present invention.

FIG. 1A is an exemplary illustration of an overarching network system 100 configured to implement one or more aspects of the present invention. The network system 100 comprises a smart network 102, an external network 110, and an applet store 116. The external network 110 may comprise the well-known Internet or any other data network system. The smart network 102 includes a smart network host device 120 configured to transmit network data packets between the external network 110 and connected devices within the smart network 102, such as computer 170 and client devices 130. Any technically feasible wireless or wired physical transport technology may be implemented to transmit the network data packets. The smart network host device 120 maintains a network state model 178 that represents the different entities and related services operating within the smart network 102. For example, if client device 130(0) implements a printer with an integrated scanner and flash memory reader, then the network state model 178 would include an entry for client device 130(0), and related attributes for a printer service, scanner service, and file (or block device) service. New devices register with the smart network host device 120, which then updates the network state model 178 to include the new device.

A portal application 172, residing within the computer 170, is configured to access the network state model 178 to determine which client devices 130 are available within the smart network 102, which services the client devices 130 provide, and to access and use the services. The portal application 172 may include one or more applets 174, configured to extend functionality of the portal application 172. A given applet 174 may be associated with a specific client device 130 and may facilitate specific usage models for the client device 130 via the extended functionality. When a new client device 130 registers with the smart network 102, a most recent version of a corresponding applet 174 may not be available within the portal application 172. However, the portal application 172 may retrieve the corresponding applet 174 or version of the corresponding applet 174 from the applet store 116.

The applet store 116 is configured to facilitate access to applets 174 by the portal application 172. The applet store 116 provides storage for applets 174 corresponding to client devices 130 and makes the applets 174 available for download to the portal application 172 via the external network 110. In one example embodiment, the applet store 116 occupies a well-known location, such as a universal resource locator (URL) associated with the external network 110. Any technically feasible technique may be used to identify a particular applet 174 as corresponding to a particular client device 130. Furthermore, any technically feasible technique may be used to download the particular applet 174 and incorporate the functionality of the applet 174 to the portal 172.

Figure 1B:
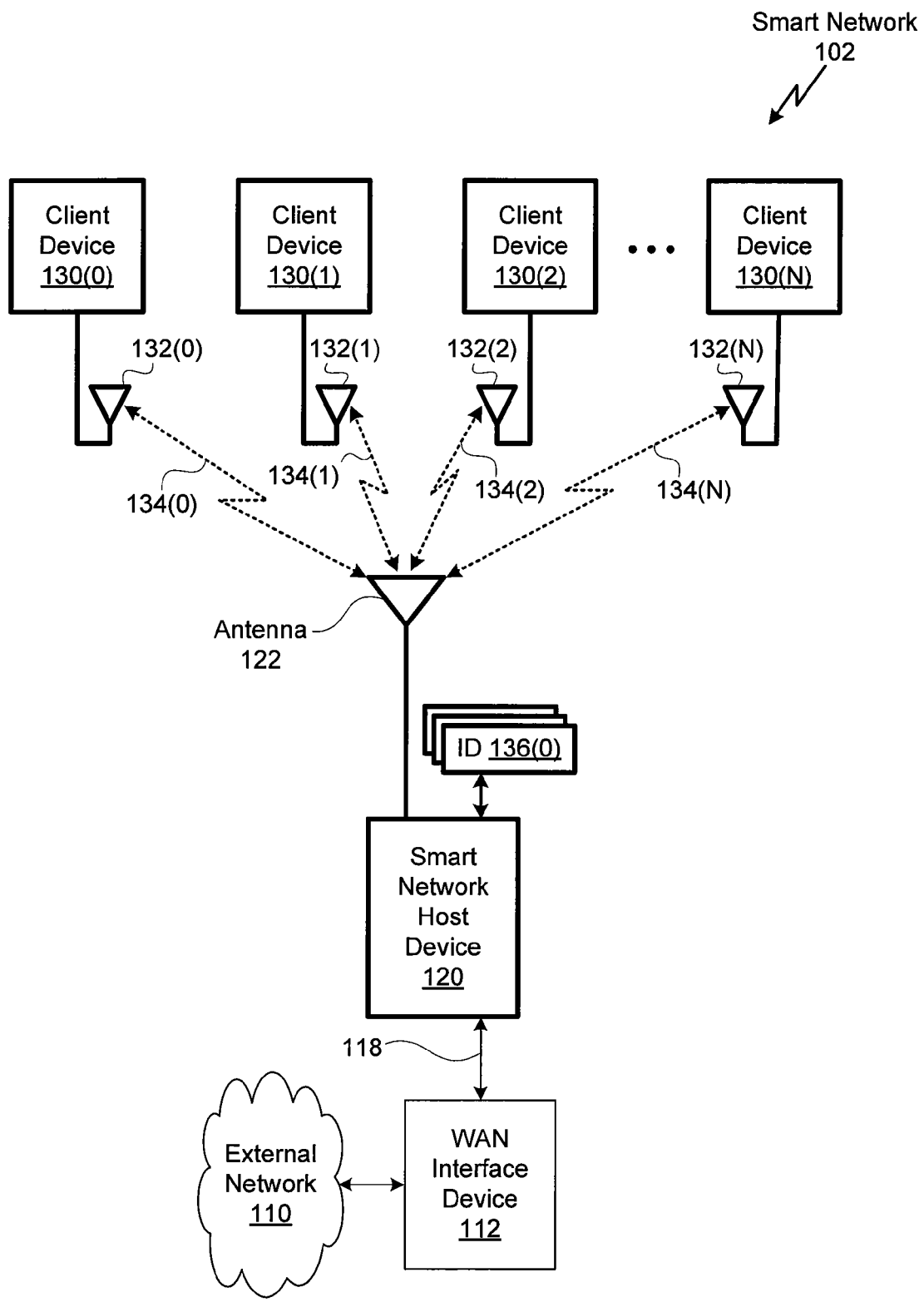
FIG. 1B illustrates the smart home network of FIG. 1A, according to one example embodiment of the present invention.

FIG. 1B illustrates the smart network 102, according to one example embodiment of the present invention. As shown, the smart network 102 comprises a smart network host device 120, one or more client devices 130, and a wide area network (WAN) interface device 112, coupled to the external network 110 of FIG. 1A. The WAN interface device 112 may implement a cable modem, digital subscriber line (DSL) modem, fiber to the home interface, or any other technically feasible device that provides digital network connectivity to the external network 110. The WAN interface device 112 is coupled to the smart network host device 120 via a network interface 118. In one example embodiment, the network interface 118 implements the well-known Ethernet standard.

The smart network host device 120 implements a wireless network interface coupled to antenna 122, which is configured to convert electrical signals to electromagnetic signals for transmitting data packets, and electromagnetic signals to electrical signals for receiving data packets. The antenna 122 may comprise plural independent radiator structures, each having a separate radiation pattern for implementing spatial multiplexing. In one example embodiment, the wireless network interface implements one or more well-known standards, such as the Institute of Electrical and Electronics Engineers (IEEE) standard 802.11, which defines a system for wireless local area networking. The antenna 122 is configured to establish wireless client links 134 to antennas 132 coupled to corresponding client devices 130. The smart network host device 120 implements Ethernet layer 2 switching for wireless data packets forwarded among client devices 130 as well as Internet protocol (IP) layer 3 routing between an IP domain associated with the smart network 102 and the external network 110. In this configuration, the smart network host device 120 provides related services and protocols, such as dynamic host configuration protocol (DHCP), network address translation (NAT), and the like.

The smart network host device 120 acts as a central authentication authority for the smart network 102 and implements authentication services for devices registering with the smart network 102. In one example embodiment, authentication is implemented via identification (ID) devices 136 that are uniquely paired with corresponding client devices 130. For example, client device 130(0) may be uniquely paired with ID device 136(0) by a manufacturer of the client device 130(0). An ID device 136(0) is physically presented to the smart network host device 120 as an authentication credential to allow a client device 130(0) paired to the ID device 136(0) to join the smart network 102. Furthermore, the client device 130(0) is able to authenticate the smart network 102 as a trusted network by accessing credentials for the corresponding ID device 136(0) specifically via the smart network 102. In one example embodiment, the ID devices 136 are implemented as near field radio frequency identification (RFID) tags. Each one of the RFID tags is configured to retain authentication credentials necessary to uniquely associate the one RFID tag with one instance of the client device 130. In this way, an RFID tag may be paired with a given client device 130. Persons skilled in the art will recognize that any technique may be implemented to generate and represent authentication credentials without departing the scope and spirit of the present invention. In alternative example embodiments, other forms of ID devices 136 may implement storage of the authentication credentials. For example, a universal serial bus (USB) storage device may be used to present authentication credentials to the smart network host device 120 for authenticating a related device, such as the computer 170. In other alternative example embodiments, a user may manually authenticate a client device 130 with the smart network host device 120. For example, the user may log onto a management web page generated by the smart network host device 120 and manually enter authentication credentials, such as a printed code associated with the client device 130.

In one usage scenario involving ID device 136, the user wishes to add a new device, such as a smart network-enabled printer to the smart network 102. The printer includes an ID device 136 implemented as an RFID tag that is paired to the printer. The user places the ID device 136 in close physical proximity to the smart network host device 120, which is then able to read the ID device 136 and authenticate the printer. The printer registers with the smart network host device 120 and is then available for use by devices connected within the smart network 102. Upon successfully reading the ID device 136, the smart network host device 120 may indicate success to the user by flashing a light-emitting diode (LED), or by generating any technically feasible indication.

Figure 1C:
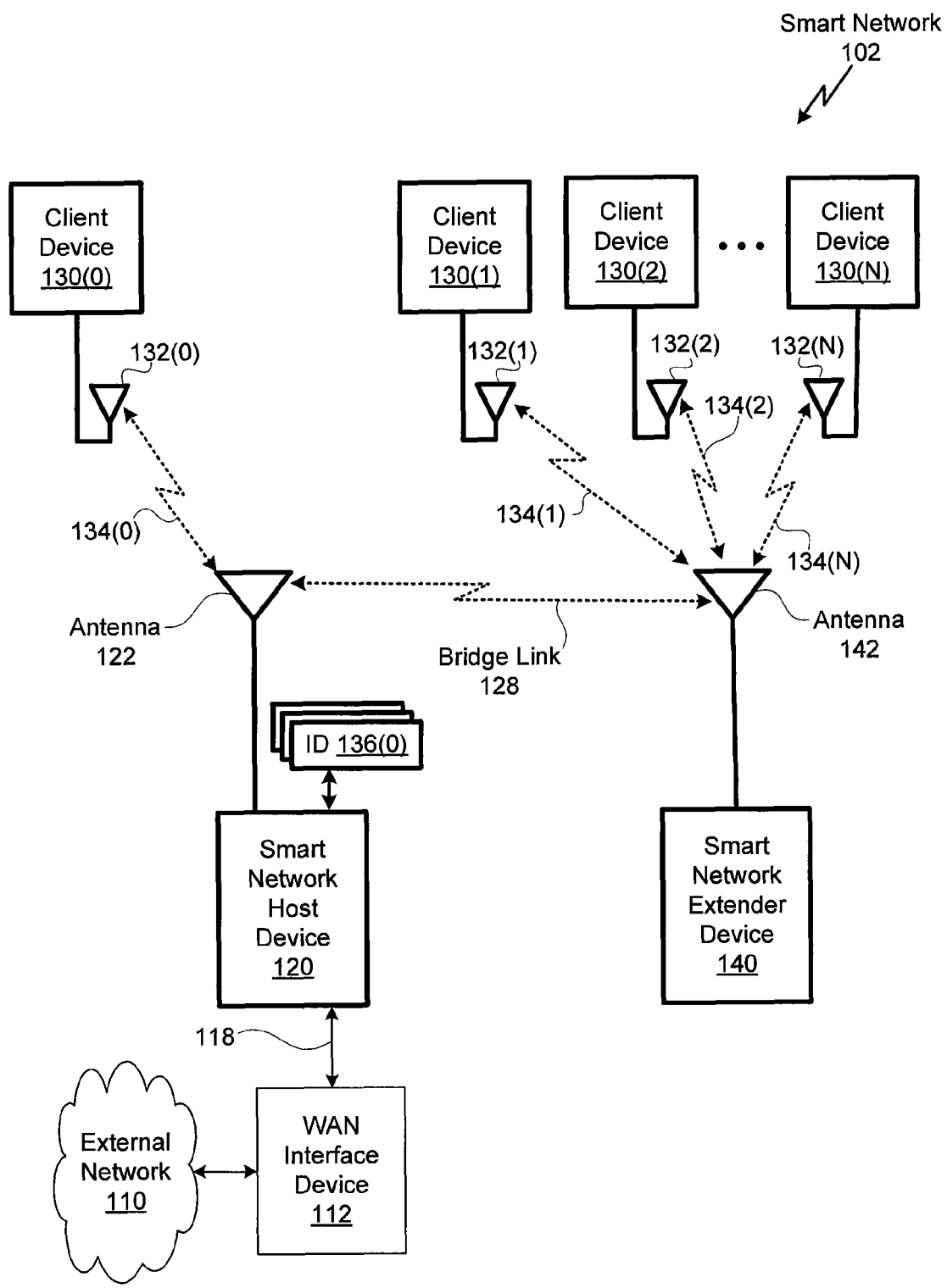
FIG. 1C illustrates the smart home network of FIG. 1A, according to another example embodiment of the present invention.

FIG. 1C illustrates the smart network 102, according to another example embodiment of the present invention. Here, the smart network 102 comprises a smart network host device 120, a smart network extender device 140, one or more client devices 130, and a wide area network (WAN) interface device 112, coupled to the external network 110 of FIG. 1A. The WAN interface device 112, smart network host device 120, and one or more client devices 130 are configured to operate as previously described in FIG. 1B.

In addition to previously described functionality, the smart network host device 120 is also configured to detect one or more smart network extender devices 140 and to establish a bridge link 128 to each of the one or more smart network extender devices 140. Each smart network extender device 140 is configured to act as a network bridge between a client device 130 and the smart network host device 120. For example, client devices 130(1) through 130(N) may be physically located such that they are able to connect to the smart network extender device 140, but not to the smart network host device 120. Furthermore, the smart network extender device 140 is able to connect to the smart network host device 120 via bridge link 128. Data packets transmitted by client devices 130(1) through 130(N) and destined to the external network 110 are received by the smart network extender device 140 and retransmitted by the smart network extender device 140 via bridge link 128 to the smart network host device 120, which then forwards the data packets to the external network 110. Similarly, data packets from the external network 110 that are destined to any of the client devices 130(1) through 130(N) are transmitted via bridge link 128 to the smart network extender device 140, which retransmits the data packets via wireless client links 134(1)-134(N). Persons skilled in the art will understand that wireless client links 134(1)-134(N) may each be configured to operate on a separate channel or band, or a common channel or band. Furthermore, bridge link 128 may operate on a separate channel or band with respect to the wireless client links 134.

In one example embodiment, each smart network extender device 140 is paired to an ID device 136, which is presented as an authentication credential to the smart network host device 120 to enable the smart network extender device 140 to participate within the smart network 102.

Figure 1D:
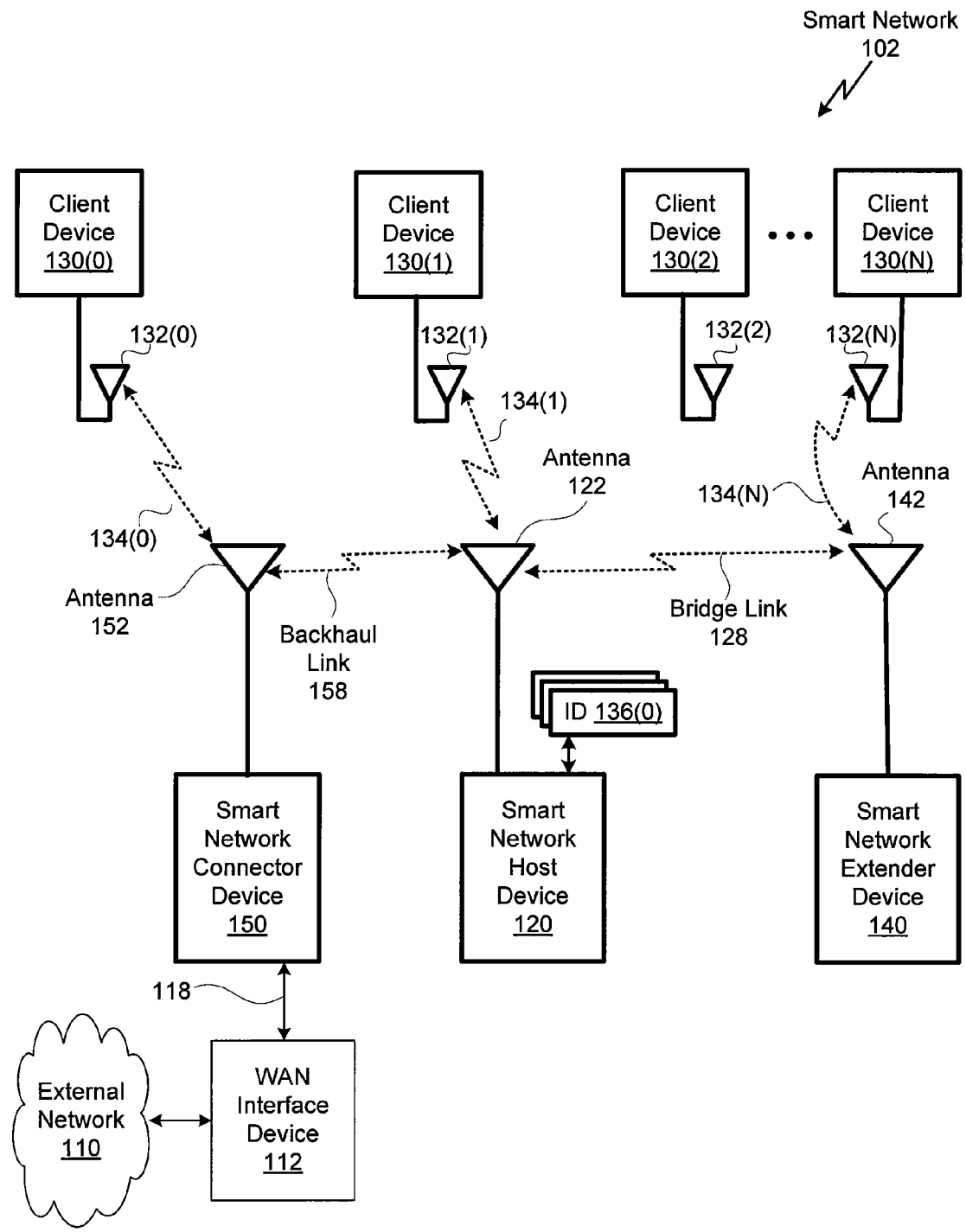
FIG. 1D illustrates the smart home network of FIG. 1A, according to yet another example embodiment of the present invention.

FIG. 1D illustrates the smart network 102, according to yet another example embodiment of the present invention. Here, the smart network 102 comprises a smart network host device 120, a smart network extender device 140, one or more client devices 130, a smart network connector device 150, and a wide area network (WAN) interface device 112, coupled to the external network 110 of FIG. 1A. The WAN interface device 112, smart network extender device 140, and one or more client devices 130 are configured to operate as previously described in FIGS. 1B and 1C.

In this example embodiment, the smart network host device 120 is configured to operate similarly with respect to FIGS. 1B and 1C. However, upon detecting the smart network connector device 150, the smart network host device 120 is configured to operate as a bridge rather than a router, and the smart network connector device 150 is configured to operate as a router. A backhaul link 158 is established between the smart network host device 120 and the smart network connector device 150.

Network data traffic between client device 130(N) and the external network 110 traverses wireless client link 134(N), bridge link 128, and backhaul link 158. This network data traffic is also forwarded by smart network extender device 140, smart network host device 120, and smart network connector device 150. A client device 130 may connect directly to any one of the network extender device 140, smart network host device 120, or smart network connector device 150. As shown, client device 130(0) is connected to smart network connector device 150 via wireless client link 134(0), client device 130(1) is connected to smart network host device 120 via wireless client link 134(1), and client device 130(N) is connected to smart network extender device 140 via wireless client link 134(N).

In one example embodiment, the smart network connector device 150 is paired to an ID device 136, which is presented as an authentication credential to the smart network host device 120 to enable the smart network connector device 150 to participate within the smart network 102. In an alternative example embodiment, the smart network connector device 150 and the smart network host device 120 are paired during a manufacturing step, eliminating the need for a separate ID device 136.

Figure 1E:
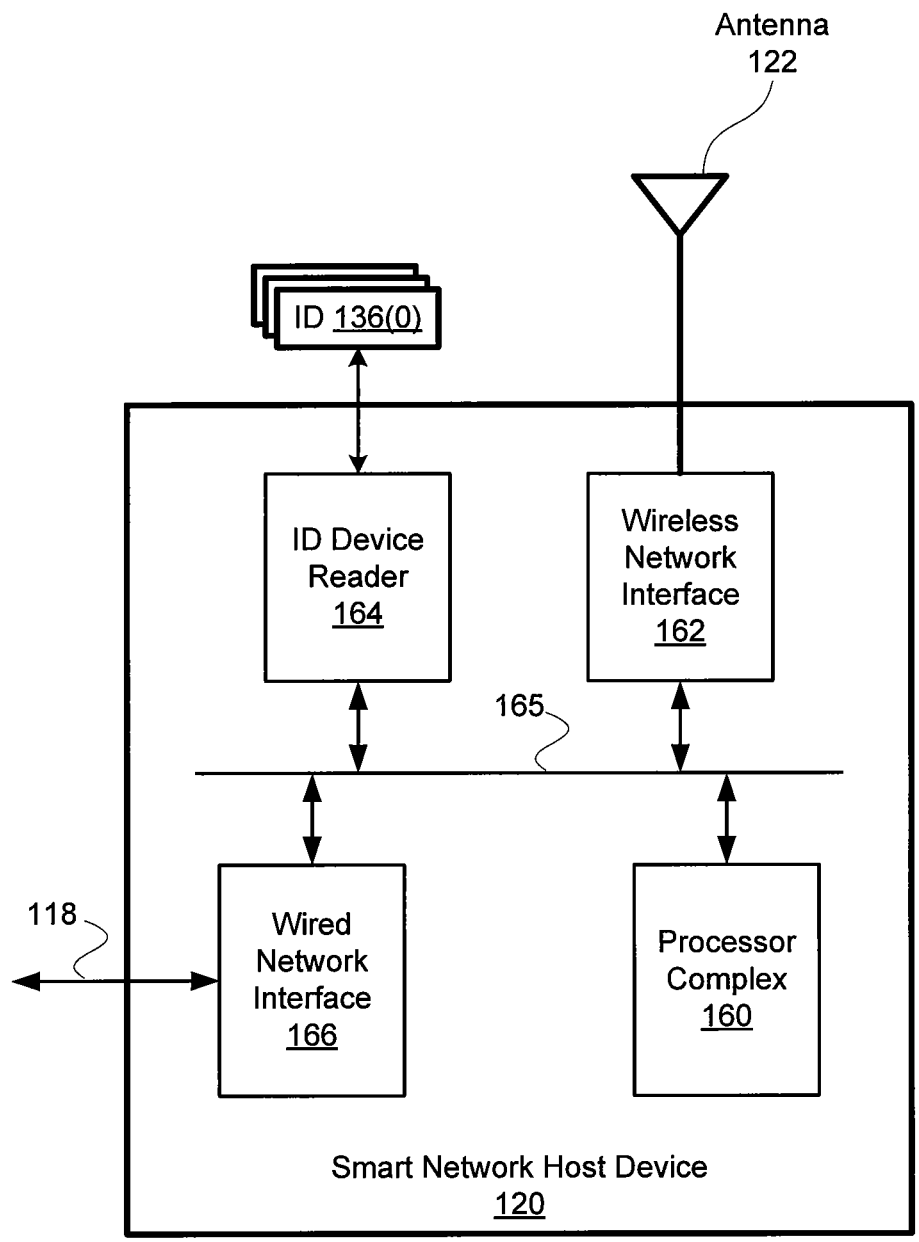
FIG. 1E is a more detailed illustration of the smart network host device of FIG. 1A, according to one example embodiment of the present invention.

FIG. 1E is a more detailed illustration of the smart network host device 120, according to one example embodiment of the present invention. As shown, the smart network host device 120 comprises a processor complex, 160, a wireless network interface 162, an ID device reader 164, and a wired network interface 166. An interconnect 165 is configured to transmit data among the processor complex 160, wireless network interface 162, ID device reader 164, and wired network interface 166. The wired network interface 166 is configured to transmit data packets via network interface 118, based on data received via the interconnect 165. The wired network interface 166 is also configured to receive data packets from the network interface 118 and transmit contents of the received data packets to the processor complex 160 via the interconnect 165. The wireless network interface 162 is configured to transmit data packets, based on data received via the interconnect 165, to one or more network devices within range. The wireless network interface 162 is also configured to receive data packets from the one or more network devices and then transmit contents of the received packets to the processor complex 160. The wireless network interface 162 is coupled to an antenna 122.

The processor complex 160 comprises a central processing unit (CPU), non-volatile memory for storing persistent programs, program state, and configuration information, random access memory (RAM) for storing temporary or volatile data, and an interface to the interconnect 165. In one example embodiment, the processor complex 160 is configured to execute an operating system and applications that provide routing services. The routing services may include, for example, data packet forwarding between the network interface 118 and the wireless network interface 162. The packet forwarding services may include, without limitation, bridging among the one or more network devices via the wireless network interface 162.

The ID device reader 164 is configured to read data from an associated ID device 136. In one example embodiment, the ID device reader 164 is configured to read data from RFID tags comprising the ID device 136. The ID device reader 164 may also include a USB reader.

In certain example embodiments, the smart network host device 120 comprises one or more integrated circuits that implement respective functions of the smart network host device 120. For example, the processor complex 160, wired network interface 166, and wireless network interface 162 may be integrated into a single integrated circuit.

Persons skilled in the art will recognize that the smart network extender device 140 may be implemented using the basic architecture of the smart network host device 120, with the exception that the ID device reader 164 and wired network interface 166 are not required for the smart network extender device 140. Similarly, the smart network connector device 150 may be implemented using the basic architecture of the smart network host device 120, with the exception that the ID device reader 164 is not required for the smart network connector device 150.

Figure 1F:
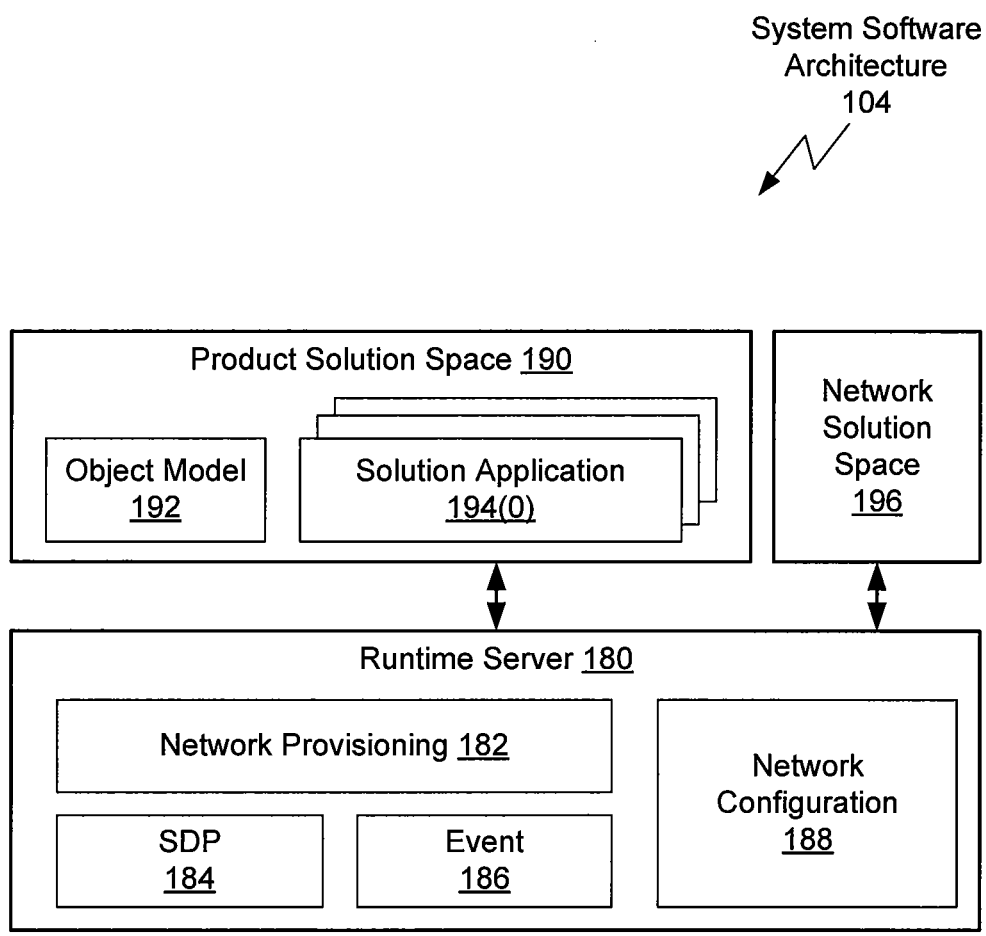
FIG. 1F illustrates a system software architecture for the smart network host device of FIG. 1E, according to one example embodiment of the present invention.

FIG. 1F illustrates a system software architecture 104 for the smart network host device 120, according to one example embodiment of the present invention. As shown, the software architecture 104 includes several software modules within the smart network host device 120. Programming instructions stored within the processor complex 160 implement a portion of the system software architecture 104 that includes a runtime server 180, a product solution space 190, and a network solution space 196. The product solution space 190 comprises an object model 192 and one or more solution applications 194. The object model 192 provides a standard, consistent abstraction of different network elements and related services within the smart network 102. Exemplary network elements include devices coupled to the smart network 102, such as printers, cameras, and display devices. Exemplary services include device and service discovery, event tracking and generation, and state presentation for the different elements. In one example embodiment, the object model 192 includes a network interface based on the well-known extensible markup language (XML). One or more solution applications 194 provide specific functionality, such as a specific view of a storage system, or a specific technique for presenting certain data. The network solution space 196 includes software modules configured to provide management of network elements and network services, including device services, local area network services within the smart network 102, and wide area network services related to connectivity management of the external network 110.

The runtime server 180 comprises a network provisioning module 182, a service and discovery provisioning (SDP) module 184, an event module 186, and a network configuration module 188. The event module 186 tracks different network events, such as a network device advertising presence or updating status within the smart network 102. The SDP module 184 maintains a persistent view of different network devices and related services, based on data from the event module 186 and on data from the network devices. The network provisioning module 182 provides authentication and authorization for network devices within the smart network 102. Authentication credentials may be presented via a given ID device 136. The network provisioning module 182 may also facilitate certain network services, such as DHCP leases. The network configuration module 188 includes hardware platform-specific implementation methods for network configuration and management. The persistent view comprises the network state model 178 of FIG. 1A.

Persons skilled in the art will recognize that the smart network connector device 150 and smart network extender device 140 may be implemented using an appropriate subset of the system software architecture 104 described above in conjunction with FIG. 1F.

According to example embodiments of the invention, a user of the network system 100 can access one or more devices or services associated with the smart network 102 from a second smart network included in the network system 100. One or more portable identification devices associated with the smart network 102 can be carried with a user of the smart network 102 to the second smart network and used to automatically identify the smart network 102 and allow authorized access to the smart network 102 via the second smart network. The one or more portable identification devices are configured to automatically provision the second smart network with the information necessary for the second smart network to identify the smart network 102 and the authorization credentials to connect to the smart network 102. In some example embodiments, the portable identification devices comprise one or more of ID devices 136(1)-136(N) described above in conjunction with FIG. 1B.

Figure 2:
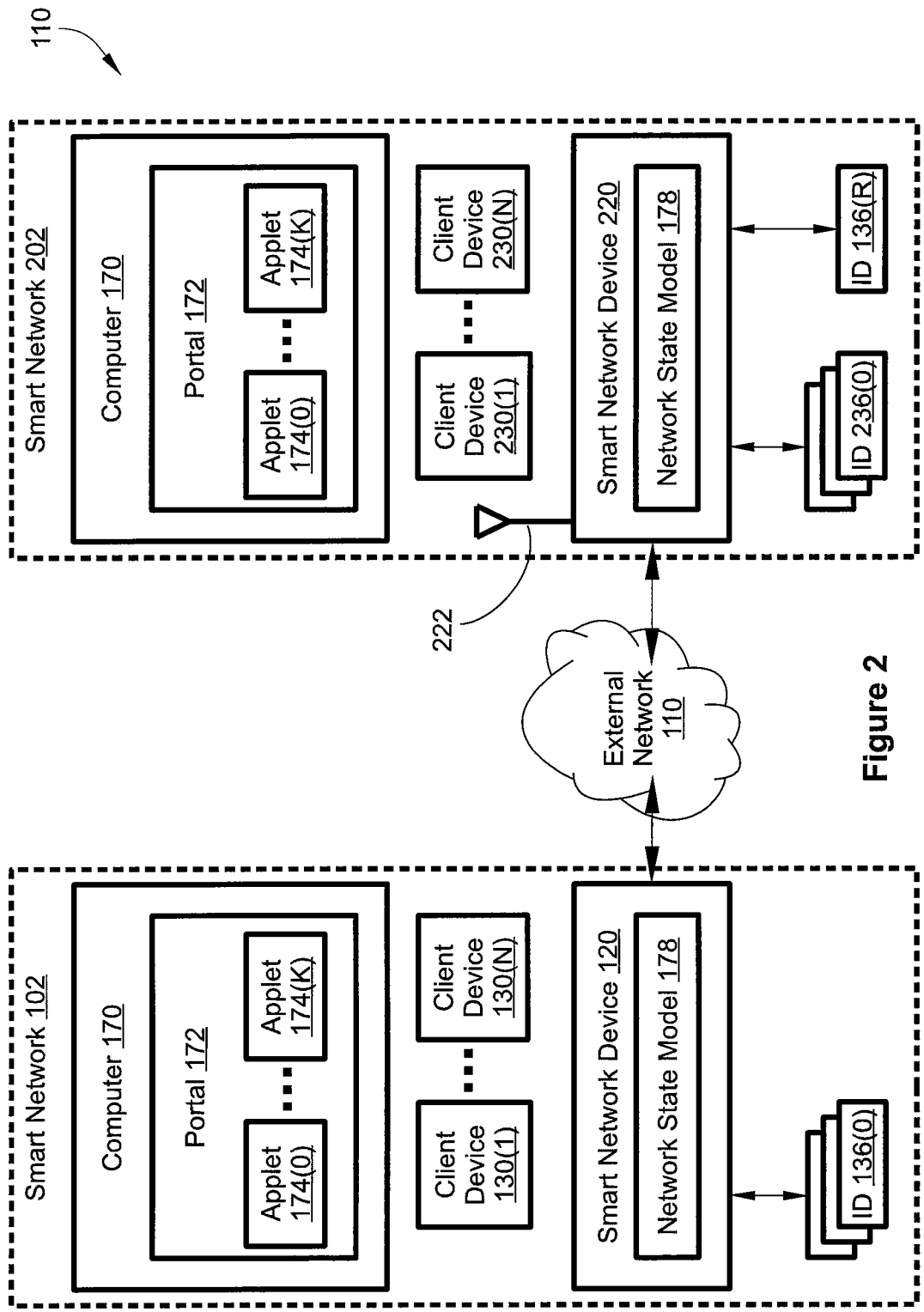
FIG. 2 illustrates two smart networks in a network system, according to an example embodiment of the invention.

FIG. 2 illustrates the smart network 102 and a second smart network 202 in the network system 100, according to an example embodiment of the invention. The second smart network 202 is substantially similar in organization and operation to the smart network 102, may connect to the smart network 102 via the external network 110, and includes a smart network host device 220, an antenna 222, one or more client devices 230, a computer 270 with portal application 172, and the like. It is noted that while the client devices 230(1)-230(N) of the second smart network 202 may differ from the client devices 130(1)-130(N) of the smart network 102, the general operation of second smart network 202 with respect to the client devices 230(1)-230(N) is substantially the same as that of the smart network 102 with respect to the client devices 130(1)-130(N).

In FIG. 2, a user of the smart network 102, along with one of ID devices 136(1)-136(N), has left the proximity of the smart network 102 and entered the physical region served by the second smart network 202. As shown, the specific ID device of the smart system 102 that has been brought into proximity with the second smart network 202 is denoted 136(R). When brought into proximity with the second smart network 202, ID device 136(R) is connected to the smart network 202 and provisions the second smart network 202 with network identification information and authentication credentials for the smart network 102. In this way, the second smart network 202 can establish a network-level connection to the smart network 102 so that the user of the smart network 102 can access devices and/or services on the smart network 102, e.g., client devices 130(0)-130(N).

When configured to provision the second smart network 202 with network identification information and authentication credentials, ID device 136(R) may have any of the configurations described above for ID devices 130(0)-130(N). More generally, ID device 136(R) may be any portable information-provisioning device that includes a data storage medium configured with a protected data storage region that retains the requisite authentication credentials for the smart network 102 and/or one or more of client devices 130(0)-130(N). Suitable information-provisioning devices include universal serial bus (USB) drives that are manufactured with write-protected encrypted bits, RFID tags, optical disks with manufactured keys, secure digital (SD) memory cards with digital right management (DRM) features, and the like. In some embodiments, the ID device 136(R) comprises a Bluetooth-enabled device that provides the network identification and authentication credentials to the smart network 202 using a Bluetooth connection.

How the ID device 136(R) is connected to the smart network 202 depends on the configuration of the ID device 136(R). For example, in embodiments in which the ID device 136(R) comprises an RFID tag, connection to the second smart network 202 can be as straight-forward as physically presenting the ID device 136(R) to the second smart network 202. Thus, as soon as the ID device 136(R) is within a working radius of an RFID reader disposed in the smart network host device 220, the smart network host device 220 detects that the ID device 136(R) is associated with the smart network 102. Similarly, in embodiments in which the ID device 136(R) comprises a Bluetooth-enabled device, suitable Bluetooth-enabled components of the second smart network 202, such as the smart network host device 220, may detect the presence of the ID device 136(R). In embodiments in which the ID device 136(R) comprises a USB drive with write-protected encrypted bits, connection to the second smart network 202 includes inserting the ID device 136(R) into an appropriate USB port of the smart network host device 220 so that the second smart network 202 can be provisioned with the requisite network identification and authorization credentials. In any of these embodiments, once the connection is made between the ID device 136(R) and the smart network host device 220, user involvement is no longer required for the second smart network 202 to connect with and provide access to the smart network 102. Alternatively, the user of the smart network 102 may also be required to enter a conventional user password for access to the smart network 102.

In some example embodiments, the ID device 136(R) is a portable identification device that includes network identification information and authorization credentials (described in greater detail below in conjunction with FIG. 3) suitable for the second smart network 202 to establish a network-level connection and access to the smart network 102. Consequently, once the ID device 136(R) is connected to the second smart network 202, and as long as the ID device 136(R) remains connected to the second smart network, the user of the smart network 102 can access the smart network 102 as an extension of the second smart network 202, and are therefore devices and/or services on the smart network 102 are discoverable via the second smart network 202. The fact that the proximity and/or connectivity of the ID device 136(R) to the second smart network 202 must be maintained for access to the smart network 102 to continue provides an additional layer of security for the smart network 102; the smart network 202 is only provisioned with a non-persisent connection, and once the ID device 136(R) leaves the physical region served by the second smart network 202, the connection between the smart network 102 and the second smart network 202 is broken. In some embodiments, such a non-persistent connection is provisioned via network identification information included in the ID device 136(R) that allows the smart network 102 to recognize the second smart network 202 as a visiting network.

Another layer of security for the smart network 102 may be added with a normal password protocol. Thus, to access client devices 130 and/or services on the smart network 102 that have an elevated privilege level, e.g., administrator privileges, the user of the smart network 102 may also be required to enter a password corresponding to that level of privilege on the smart network 102. Such a password protocol would be a security requirement applied in additional to the use of the ID device 136(R) as described above.

In other example embodiments, the ID device 136(R) may further include authorization credentials for a specific device or service that is on the smart network 102. For example, the ID device 136(R) may be associated with the client device 130(1) on the smart network 102, which may be a desktop PC, printer, digital camera, etc. Because the ID device 136(R) also includes authorization credentials for the client device 130(1), the client device 130(1) will recognize the user of the smart network 102 as an authorized user on a trusted network connection and the client device 130(1) will allow access via the second smart network 202 as long as the ID device 136(R) is connected to the second smart network 202. No additional user involvement is required for the user of the smart network 102 to access the client device 130(1). Alternatively, in addition to the authorization credential provided automatically by the ID device 136(R), the user of the smart network 102 may also be required to enter a conventional user password associated with the client device 130(1) or service of interest in order to access the client device 130(1) or the service of interest.

In some example embodiments, the ID device 136(R) may include authorization credentials for multiple devices or services that are on the smart network 102. For example, the ID device 136(R) may provide authorization to the user of the smart network 102 for accessing all of a specific type of client device 130 on the smart network 102, such as all printers, when the ID device 136(R) is connected to the second smart network 202. Alternatively, the ID device 136(R) may provide authorization to the user of the smart network 102 for access to a specific and predetermined group of client devices 130 on the smart network 102. For example, all client devices 130 associated with a particular work station on the smart network 102, or all client devices 130 located in a particular room or other physical location may be made available to the user of the smart network 102 when the ID device 136(R) is connected to the second smart network 202.

In an alternative example embodiment, the ID device 136(R) may include authorization credentials for devices and/or services that have a specific access level on the smart network 102. Thus, when the ID device 136(R) is connected to the second smart network 202, the user of the smart network 102 will be recognized by the smart network 102 as a user having a specific authorization level on the smart network 102, e.g., administrator, user, guest, etc. Thus, in such an example embodiment, access to client devices 130 and/or services on the smart network 102 that require higher than network-level privileges is not granted unless the ID device 136(R) is connected to the second smart network 202. Alternatively, a corresponding password may also be required by the smart network 102 before access is granted to the user of the smart network 102 for higher-privilege client devices 130 and/or services when such access is requested via the second smart network 202 as described herein.

Figure 3:
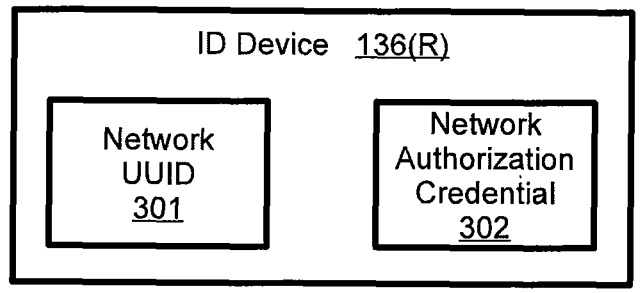
FIG. 3 schematically illustrates a configuration of an identification device, according to one example embodiment of the invention.

FIG. 3 schematically illustrates a configuration of the ID device 136(R), according to one example embodiment of the invention. The ID device 136(R) includes information associated with the smart network 102 that identifies the smart network 102 and allows authorized access to the smart network 102 via the second smart network 202. In the example embodiment illustrated in FIG. 3, the ID device 136(R) includes a network universally unique identifier (UUID) 301 and a network authorization credential 302, as shown.

The network UUID 301 includes a unique reference number used as an identifier for the smart network 102 that differentiates the smart network 102 from other smart networks and devices found in the network system 100. In some example embodiments, the network UUID 301 is similar in format to globally unique identifiers (GUIDs), however, other formats for the network UUID 301 may be utilized without departing from the scope of the invention. For example, the network UUID 301 may include the media access control address (MAC address) of the smart network host device 120, in order to uniquely identify the smart network 102. The MAC address of the smart network host device 120 is known to the smart network host device 120, is a unique identifier that has no risk of name conflicts with any other devices throughout the network system 100, and can be stored in a suitable format in ID device 136(R). In one embodiment, the network UUID 301 is written to the ID device 136(R) at time of manufacture. In another embodiment, the ID device 136 (R) is a writable RFID tag, and UUID 301 is written to the ID device 136(R) by the smart network host device 120 either during setup of the smart network 102 or at any other time before the user of the smart network 102 has left the smart network 102 with the ID device 136(R). In such an embodiment, the network UUID 301 may include information indicating that any network using the network UUID 301 to connect to the smart network 102, e.g., the second smart network 202, will be recognized as a visiting network, and will only be provisioned with a non-persistent connection to the smart network 102.

The network authorization credential 302 allows authorized access to the smart network 102 from the second smart network 202. The network authorization credential 302 may be an encrypted key for device-to-device authentication, in this case between the smart network host device 120 and the smart network host 220, once the smart network host device 220 has identified the smart network host device 120 via the network UUID 301. The data included in the network authorization credential 302 may be stored in any format known in the art suitable for authorization credentials without departing from the scope of the invention. In one example embodiment, the network authorization credential 302 includes at least a portion of the MAC address of the smart network host device 120. In some embodiments, the network authorization credential 302 is a high-entropy key, such as a 128-bit key. In embodiments in which the ID device 136(R) comprises a Bluetooth-enabled device, the network authorization credential 302 may include a wireless MAC address that can be utilized as an authorization credential much in the same way that wireless services are paid for.

In one embodiment, the network authorization credential 302 is written to the ID device 136(R) at time of manufacture and is read or learned by the smart network host device 120 either during setup of the smart network 102 or at any other time before the user of the smart network 102 has left the smart network 102 with the ID device 136(R). Alternatively, the network authorization credential 302 may be written to both the smart network host device 120 and the ID device 136(R) at time of manufacture. In either case, in such an embodiment, the network authorization credential 302 is a shared secret known by the ID device 136(R) and the smart host network device 120 and can be used to set up a secure connection between the smart network 102 and the second smart network 202. For example, a protocol handshake between the ID device 136(R) and the smart network host device 120 can be performed using a secure remote password authentication protocol. Such a protocol includes a dual challenge mechanism, in which the network authorization credential 302 is never broadcast between the ID device 136(R) and the smart network host device 120. Instead, using encryption algorithms known in the art, the ID device 136(R) proves to the smart network host device 120 that the ID device 136(R) knows the network authorization credential 302 and the smart network host device 120 proves to the ID device 136(R) that the smart host network device 120 also knows the network authorization credential 302. If either device fails to provide the correct information during such a protocol handshake, the other device terminates the session and no network connection will be established between the ID device 136(R) and the smart network 102.

Figure 4:
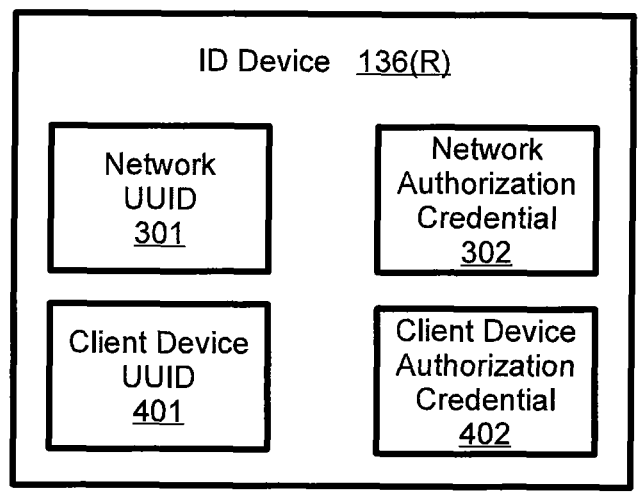
FIG. 4 schematically illustrates a configuration of an identification device, according to another example embodiment of the invention.

FIG. 4 schematically illustrates a configuration of the ID device 136(R), according to another example embodiment of the invention. In the example embodiment illustrated in FIG. 4, the ID device 136(R) includes the network UUID 301 and the network authorization credential 302, so that the ID device 136(R) can provision the second smart network 202 with the required information to establish a network-level connection between the smart network 102 and the second smart network 202. The ID device 136(R) further includes a client device UUID 401 and a client device authorization credential 402, so that the presence of the ID device 136(R) on the second smart network 202 enables access to a specific client device 130 associated with the ID device 136(R), hereinafter referred to as client device 130(R). The client device 130(R) may be associated with the ID device 136(R) at the time of manufacture, during the setup of the smart network 102, or when the client device 130(R) is added to the smart network 102.

The client device UUID 401 includes a unique reference number used as an identifier for the client device 130(R). The client device UUID 401 differentiates the client device 130 (R) from any other client devices 130 found in the smart network 102 or elsewhere in the network system 100. The client device UUID 401 is otherwise substantially similar in format and content to the network UUID 301 described above in conjunction with FIG. 3. When the ID device 136(R) is connected to the second smart network 202, the client device UUID 401 allows the second smart network 202 to identify the client device 130(R).

The client device credential 402 may be an encrypted key for device-to-device authentication, in this case between the client device 130(R) and the ID device 136(R), once the latter is connected to the second smart network. The client device credential 402 is otherwise substantially similar in format and content to the network authorization credential 302 described above in conjunction with FIG. 3. Specifically, the client device credential 402 may act as a shared secret between the smart network host device 220 and the client device 130(R). Thus, when the ID device 136(R) is connected to the second smart network 202, the client device credential 402 allows authorized access to the client device 130(R) from the second smart network 202 without further action by the user of the smart network 102. In some example embodiments, an additional security layer for client device 130(R) may be provided with a password entry. It is noted that information related to such password entry is not included in the ID device 136(R).

In operation, the network system 100 in FIG. 2 enables a user of the smart network 102 to access one or more client devices 130 or services associated with the smart network 102 via the second smart network 202. When a user of the smart network 102 enters the physical region served by the second smart network 202, ID device 136(R) is connected to the smart network 202 and provisions the second smart network 202 with network identification information and authentication credentials for the smart network 102, e.g. the network UUID 301 and the network authorization credential 302 illustrated in FIG. 3. Specifically, by examining the network UUID 301, the smart network host device 220 identifies that the ID device 136(R) is from a remote smart network, i.e., the smart network 102. The smart network host device 220 performs the requisite authentication with the smart network 102 using the network authorization credential 302 from the ID device 136(R), such as the secure remote password authentication protocol described above in conjunction with FIG. 3. If said authorization is successfully completed, the smart network host device 220 builds a virtual private network (VPN) tunnel or other logical network connection between the smart network 102 and the second smart network 202, and access to the smart network 102 is granted. The network-level connection between the smart network 102 and the second smart network 202 is maintained until the ID device 136(R) is removed from the second smart network 202.

Figure 5:
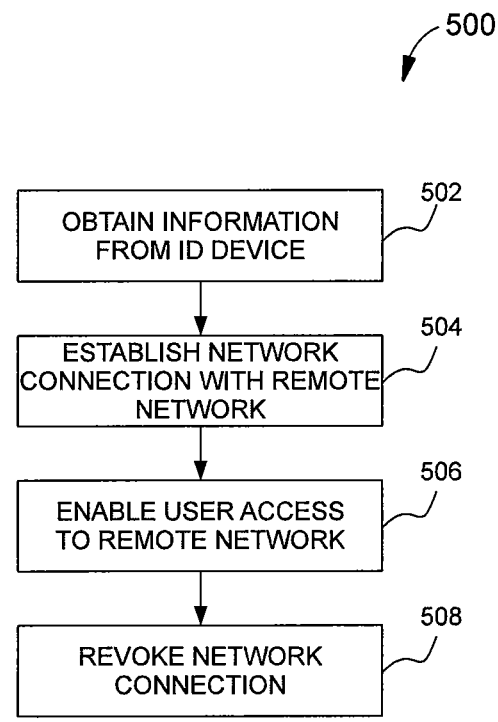
FIG. 5 is a flowchart of method steps for connecting a remote network and a local network using an identification device associated with the remote network, according to one example embodiment of the present invention.

FIG. 5 is a flowchart of method steps for connecting a remote and local network using an identification device associated with the remote network, according to one example embodiment of the present invention. Although the method steps are described in conjunction with the network system 100 of FIG. 2, persons skilled in the art will understand that any network system configured to perform the method steps, in any order, is within the scope of the invention.

As shown, the method 500 begins at step 501, where the smart network host device 220 detects the presence of the ID device 136(R). In some embodiments, close proximity of the ID device 136(R) to the smart network host device 220 is the only requirement for such detection to take place. In other embodiments, such as when the ID device 136(R) is a USB drive manufactured with write-protected encrypted bits, the smart network host device 220 detects the ID device 136(R) when the ID device 136(R) is inserted in a USB slot of the smart network host device 220. In embodiments in which the ID device 136(R) is a Bluetooth-enabled device, the presence the ID device 136(R) is detected when the ID device 136(R) is within the effective transmission range of Bluetooth-enabled components of the second smart network 202. In such embodiments, suitable Bluetooth-enabled components of the second smart network 202 that may detect the presence of the ID device 136(R), including the smart network host device 220, a smart network extender device similar to smart network extender device 140, and a smart network connector device similar to smart network connector device 150.

In step 502, the smart network host device 220 obtains information from a portable device associated with the smart network 102, i.e., the ID device 136(R). The information obtained from the ID device 136(R) includes the network UUID 301, which identifies the smart network 102, and the network authorization credential 302, which allows authorized access to the smart network 102 from the second smart network 202.

In step 504, the smart network host device 220 establishes a network connection with the smart network host device 120 located within the smart network 102. The network connection is based on the network UUID 301 and the network authorization credential 302, and is only established between the smart network 102 and the second network 202 if the authorization process is successfully completed. Specifically, the smart network host device 220 identifies the smart network 102 via the external network 110 using the network UUID 301. Then, the smart network host device 220 establishes a level of access authorization based on the level of authorization included in the network authorization credential 302. For example, the network authorization credential 302 may include a network access level authorization that sets a global access level for the smart network 102. In another example, the network authorization credential 302 may include a device level authorization, which can only be used to set a specific access level for services that are offered by a peer device on the smart network 102.

In step 506, the smart network host device 220 enables a user of the smart network 102 to access one or more client devices 130 and/or services associated with the smart network 102. Specifically, the smart network 102 may appear as an extension of the second smart network 202 for as long as the network connection established in step 504 is maintained.

In step 508, the smart network host device 220 revokes the network connection established in step 504 with the smart network host device 120. The revocation occurs when the smart network host device 220 detects that the ID device 136(R) is no longer connected to the smart network 102, for example, when the ID device 136(R) is configured as an RFID tag, the ID device 136(R) is disconnected from the second smart network as soon as the ID device 136(R) is no longer disposed proximate the smart network host device 220. In other example embodiments, the ID device 136(R) is disconnected from the second smart network when the ID device 136(R) is removed from a USB port, optical disk drive, etc.

In sum, example embodiments of the invention provide systems and methods for connecting a remote network and a local network using a portable identification device associated with the remote network. Because the portable identification device is configured with network identification information and authentication credentials, a smart network host device can automatically and reliably establish a network-level connection between the local and remote networks. Advantageously, no router configuration or other complicated procedures are performed by the user of the remote network, either prior to leaving the home network or upon entering the new network, which makes accessing a remote network a substantially transparent process to the user. In some example embodiments, a further advantage is that the portable identification device acts an additional layer of security for the remote network, since its presence on the local network is required for maintaining the network connection between the remote and local networks.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

While the foregoing is directed to certain example embodiments of the present invention, other and further embodiments of the invention may be devised without departing from the basic scope thereof. Therefore, the scope of the present invention is determined by the claims that follow.

We claim:

1. A method, comprising:
 upon detecting a portable device within a local network, obtaining information from the portable device, wherein the information identifies a remote network and allows authorized access to the remote network;
 transmitting, from the local network, to a network host device located within the remote network, a first authentication credential based on the obtained information from the portable device, wherein the network host device is configured to authenticate the portable device based on the first authentication credential;
 authenticating the network host device, based on a second authentication credential communicatively corresponding to the network host device;

upon successfully authenticating the network host device, and further upon the successful authentication of the portable device by the network host device, establishing, from the local network, a secure network connection with the network host device located within the remote network, based on the obtained information from the portable device, whereby the established secure network connection enables a computing device within the local network and that is distinct from the portable device, to access at least one of one or more devices and one or more services connected to the remote network via the established secure network connection so long as the portable device remains within the local network; and responsive to detecting that the portable device is no longer present within the local network, terminating the secure network connection established with the network host device, such that the computing device can no longer access the remote network devices and services.

2. The method of claim 1, wherein the portable device includes one or more protected data storage areas, and data within the one or more data storage areas cannot be copied or overwritten with other data.

3. The method of claim 2, wherein the portable device comprises a near-field radio frequency identification (RFID) tag, a universal serial bus (USB) drive manufactured with write-protected encrypted bits, an optical disk with manufactured keys, a secure digital (SD) memory card with digital rights management (DRM) features, or a Bluetooth-enabled device.

4. The method of claim 1, wherein enabling access comprises causing the one or more devices or one or more services associated with the remote network to be discoverable on the local network.

5. The method of claim 1, wherein the obtained information includes identification information for at least one client device or service associated with the remote network and an authorization credential for the at least one of one more or more client devices and one or more services associated with the remote network.

6. The method of claim 1, wherein the portable device comprises a near-field RFID tag, and detecting that the portable device is no longer present comprises detecting that the portable device is no longer proximate to the network host device located within the local network.

7. A non-transitory computer-readable medium including instructions that, when executed by a processing unit, cause the processing unit to perform the steps of:

upon detecting a portable device within a local network, obtaining information from the portable device, wherein the information identifies a remote network and allows authorized access to the remote network;

transmitting, from the local network, to a network host device located within the remote network, a first authentication credential based on the obtained information from the portable device, wherein the network host device is configured to authenticate the portable device based on the first authentication credential;

authenticating the network host device, based on a second authentication credential corresponding to the network host device;

upon successfully authenticating the network host device, and further upon the successful authentication of the portable device by the network host device, establishing, from the local network, a secure network connection with the network host device located within the remote network, based on the obtained information from the portable device, whereby the established secure network connection enables a computing device within the local network and that is distinct from the portable device, to access at least one of one or more devices and one or more services communicatively connected to the remote network via the established secure network connection so long as the portable device remains within the local network; and responsive to detecting that the portable device is no longer present within the local network, terminating the secure network connection established with the network host device, such that the computing device can no longer access the remote network devices and services.

8. The non-transitory computer-readable medium of claim 7, wherein the portable device includes one or more protected data storage areas, and data within the one or more data storage areas cannot be copied or overwritten with other data.

9. The non-transitory computer-readable medium of claim 8, wherein the portable device comprises a near-field radio frequency identification (RFID) tag, a universal serial bus (USB) drive manufactured with write-protected encrypted bits, an optical disk with manufactured keys, a secure digital (SD) memory card with digital rights management (DRM) features, or a Bluetooth-enabled device.

10. The non-transitory computer-readable medium of claim 7, wherein enabling access comprises causing the one or more devices or one or more services associated with the remote network to be discoverable on the local network.

11. The non-transitory computer-readable medium of claim 7, wherein the obtained information includes identification information for at least one client device or service associated with the remote network and an authorization credential for the at least one of one or more client devices and one or more services associated with the remote network.

12. The non-transitory computer-readable medium of claim 7, wherein the portable device comprises a near-field RFID tag, and detecting that the portable device is no longer present comprises detecting that the portable device is no longer proximate to the network host device located within the local network.

13. A system, comprising:
a network host device located within a local network that is configured to:

upon detecting a portable device within a local network, obtain information from the portable device, wherein the information identifies a remote network and allows authorized access to the remote network;

transmit, from the local network, to a network host device located within the remote network, a first authentication credential based on the obtained information from the portable device, wherein the network host device is configured to authenticate the portable device based on the first authentication credential;

authenticate the network host device, based on a second authentication credential corresponding to the network host device;

upon successfully authenticating the network host device, and further upon the successful authentication of the portable device by the network host device, establish, from the local network, a secure network connection with the network host device located within the remote network, based on the obtained information from the portable device, whereby the established secure network connection enables a computing device within the local network and that is distinct from the portable device, to access at least one of one or more devices and one or more services communicatively connected to the remote network via the established secure network connection so long as the portable device remains within the local network; and responsive to detecting that the portable device is no longer present within the local network, terminate the secure network connection established with the network host device, such that the computing device can no longer access the remote network devices and services.

14. The system of claim 13, wherein the obtained information includes identification information for at least one client device or service associated with the remote network and an authorization credential for the at least one of one or more client devices and one or more services associated with the remote network.

* * * * *